United States Patent

Soethout

[11] Patent Number: 5,090,301
[45] Date of Patent: Feb. 25, 1992

[54] ARRANGEMENT FOR VENTILATING THE PASSENGER SPACE OF A MOTOR VEHICLE

[75] Inventor: Freddie Soethout, Pulheim, Fed. Rep. of Germany

[73] Assignee: Siemens Aktiengesellschaft, Berlin and Munich, Fed. Rep. of Germany

[21] Appl. No.: 602,009

[22] Filed: Oct. 23, 1990

[30] Foreign Application Priority Data

Oct. 31, 1989 [EP] European Pat. Off. ........ 89120219.4

[51] Int. Cl.⁵ .............................................. B60H 1/34
[52] U.S. Cl. ................................. 454/159; 454/136; 454/152
[58] Field of Search .................. 98/2.03, 2.04, 2.05, 98/2.14, 2.15; 237/12.3 A

[56] References Cited

U.S. PATENT DOCUMENTS

| | | | |
|---|---|---|---|
| 2,234,268 | 3/1941 | McCollum | 237/28 |
| 2,363,839 | 11/1944 | Demuth | 98/31.5 |
| 2,430,335 | 11/1947 | Hart | 98/2.14 X |
| 2,989,854 | 6/1961 | Gould | 98/2.03 X |
| 3,329,077 | 7/1967 | Grosso | 98/2 |
| 4,343,230 | 8/1982 | Lundström | 98/2.05 |
| 4,807,523 | 2/1989 | Rautke et al. | 98/2.04 |

FOREIGN PATENT DOCUMENTS

| | | |
|---|---|---|
| 0255004 | 2/1988 | European Pat. Off. . |
| 3309560 | 9/1984 | Fed. Rep. of Germany . |
| 60-252019 | 12/1985 | Japan . |
| 61-143211 | 6/1986 | Japan . |
| 1351613 | 5/1974 | United Kingdom . |
| 2208542 | 4/1989 | United Kingdom . |

Primary Examiner—Harold Joyce
Attorney, Agent, or Firm—Kenyon & Kenyon

[57] ABSTRACT

A passenger car includes an arrangement for ventilating the passenger space with a wall-less channel with focused air flow to an interspace between a vehicle roof and an air-permeable roof lining. The air flow reenters the passenger space in distributed form to ensure with simple means a uniform air distribution over the entire exit area of the roof lining. The arrangement provides a focused air flow passing from the vehicle roof through the roof lining into the interspace in the sense of rebounded airflow distributed to all areas of the interspace. The focused air flow appropriately issues from a throw nozzle on a center console between front seats of a passenger car and impinges on an air entry region of the roof lining which has increased air permeability but which may not be readily visible.

10 Claims, 1 Drawing Sheet

ARRANGEMENT FOR VENTILATING THE PASSENGER SPACE OF A MOTOR VEHICLE

BACKGROUND OF THE INVENTION

The present invention relates to an arrangement for ventilating a passenger space of a motor vehicle, and more particularly to distributing airflow into the passenger space through an air permeable roof lining.

European Patent Application EP-A2-0255004 discloses an arrangement for ventilating a passenger space in an automobile where there is at least one wall less channel having focused air flow issuing from at least one throw nozzle. The flow is to an interspace between a vehicle roof and an air-permeable roof lining. The airflow reenters the passenger space in a distributed form.

A known arrangement for ventilating a motor vehicle includes air flow from the windshield through an interspace between the vehicle roof and a roof lining provided with air outlet openings into the passenger space. In such an arrangement, a wall-less air flow channel is provided in a central region of the windshield, to which channel there are assigned an air outlet nozzle in the center of the dashboard, separate from a defroster, for a focused air flow of low turbulence, and a funnel leading into the interspace in the region of the upper edge of the windshield.

The roof lining is provided, at least in regions lying directly above the seats of the passenger space, with outlet openings which are preferably designed with variable air passage cross section in such a way that the air flow issuing from each outlet opening can be adjusted individually at the respective passenger locations. For adjusting the individual air flow preferably perforated registers and possibly grilles are provided, by which the air flow issuing from the interspace is variable as to quantity and direction. Separate deflecting or guiding elements are required for the desired even flow of the air flowing horizontally into the interspace, and no outlet openings can be provided in the roof lining in the immediate inflow region of the air entering via the wall-less air flow channel along the windshield.

SUMMARY OF THE INVENTION

The present invention provides a uniform air distribution in the interspace between vehicle roof and roof lining without undesired whirl formation and with unimpeded exit option of the ventilation over the entire passenger space at a low cost of construction by producing an air flow passing through the roof lining into the interspace and rebounding from the vehicle roof to all sides. Appropriately, there is provided a focused air flow impinging on the vehicle roof substantially perpendicular to a roof center and the air-permeable roof lining at this center point. In a structurally simple and compact manner a throw nozzle for the focused air flow is provided between the front seats and arranged appropriately along a center console of the passenger car. To be able to ensure a uniform air distribution in the interspace also when the passenger space is relatively large, and especially when it is relatively long, a variant of the invention is characterized by a focused air flow directed slightly obliquely rearward, centered on the vehicle roof and the air-permeable roof lining at that point.

It has been found, surprisingly, that the channel-less focused air flow which according to the present invention enters the interspace through the roof lining, provides a ventilation uniform to all sides, turbulence free, and flowing, without draft, counter to the inflow direction from the outlet openings of the roof lining back into the passenger space without additional air guiding or air-deflecting elements, through the baffle effect of the vehicle roof closing the interspace off toward the top of that interspace.

DETAILED DESCRIPTION

Figure 1:
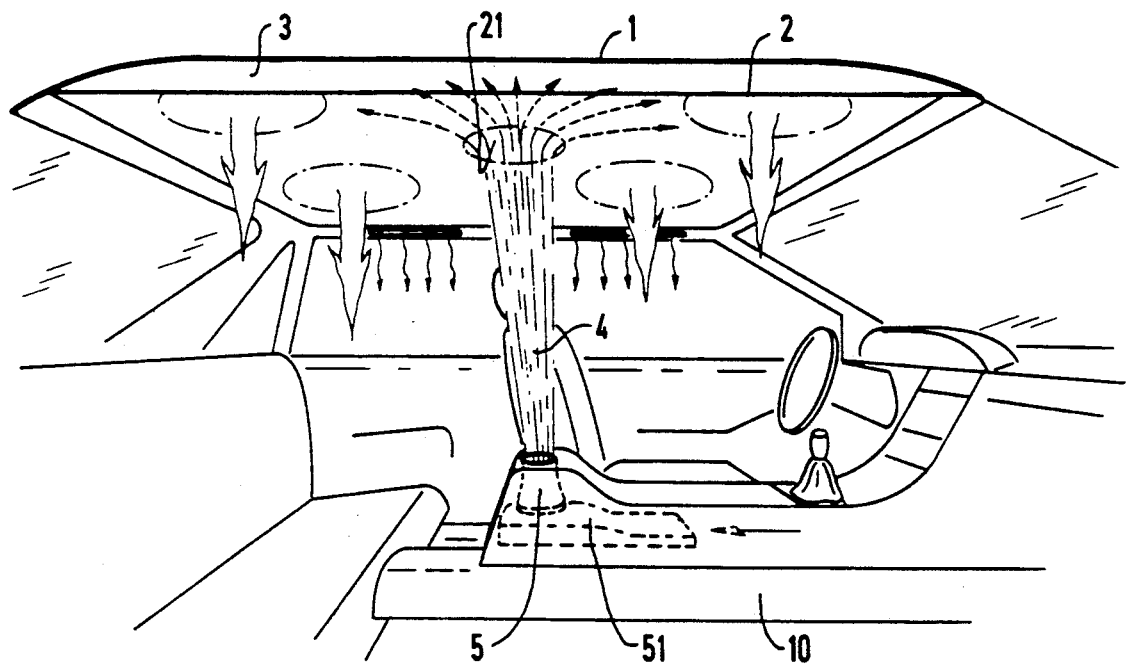
FIG. 1 shows in perspective a longitudinal section through a passenger space of a passenger car ventilated according to the present invention.
Figure 2:
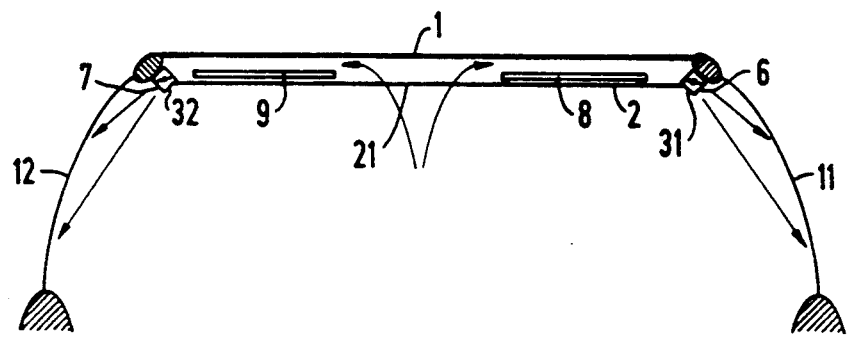
FIG. 2 illustrates a partial section through the passenger space per FIG. 1 transverse to the longitudinal axis of the motor vehicle of FIG. 1.

The passenger space of a passenger car is closed off upwardly by a vehicle roof 1. An air-permeable roof lining 2 is provided parallel to the vehicle roof 1, at a certain distance therefrom, preferably at a distance of about 33 mm, forming a defined interspace 3 therebetween. An air stream is supplied via an air feed channel 51 in the region of the center console between the front seats from a heater and/or air conditioner for the ventilation of the passenger space. The air stream issues as a focused air flow 4 from a throw nozzle 5 directed slightly obliquely inclined rearwardly and substantially directed to the center of the roof. The nozzle is disposed in the center console of the passenger space, and enters into the interspace 3 through the roof lining 2 in an air-entry region 21 of increased permeability. Instead of the optically closed air-entry region 21 (i.e., a non-visible air permeable region) here provided in the roof lining 2, a cut-out opening in the roof lining 2 may optionally be provided to obtain a higher rate of air flow.

The air flow entering via the wall-less channel and bouncing back from the vehicle roof distributes itself uniformly in the interspace 3 between the roof 1 and the roof lining 2; thereafter, the air thrown back by the rebound surface formed by the vehicle roof and distributed in the process, re-enters the passenger space - as indicated by air flow arrows in the region of the vehicle seats - through respective exit regions, e.g., perforations, of the roof lining 2.

According to another embodiment of the present invention, the temperature of the air issuing from the interspace 3 is controlled in the region of the exit regions of the roof lining 2, by panel heating elements 8, 9. The heating elements may additionally be switched on—if desired, and controllable individually per vehicle seat.

At a corresponding high pressure build-up, for example, by an especially strong focused air flow 4, according to another embodiment of the present invention, peripheral air outlets 31, 32 of the interspace 3 may alternatively be provided to ventilate the vehicle at regions near window spaces 11, 12. These peripheral air outlets are closable, if desired, by flaps 6, 7.

What is claimed is:

1. An arrangement for ventilating the passenger space of a motor vehicle comprising:
   a vehicle roof;
   an air-permeable roof lining;

an interspace region between said vehicle roof and said roof lining;

a throw nozzle providing a focused air flow to said air-permeable roof lining;

where an air flow re-entering the passenger space in a distributed form, passes on rebound from the vehicle roof through the interspace and then through the roof lining wherein the air flow is distributed to all sides of said roof lining.

2. The arrangement of claim 1, wherein the focused air flow impinges substantially perpendicular to and is centered on the air-permeable roof lining and on the vehicle roof.

3. The arrangement of claim 1, wherein the focused air flow is directed slightly obliquely rearward and is centered on the air-permeable roof lining and on the vehicle roof.

4. The arrangement of claim 1, wherein said throw nozzle, provided for the issuance of the focused air flow, is disposed between front seats of the motor vehicle.

5. The arrangement of claim 4, wherein said throw nozzle is arranged on a center console being disposed between the front seats of the motor vehicle and having an air feed channel.

6. The arrangement of claim 1, wherein said roof lining includes an air entry region having increased air permeability while said air entry is not readily visible, said entry region being disposed directly above the focused air flow.

7. The arrangement of claim 1, further comprising a cut-out opening of the roof lining in that region impinged by the focused air flow.

8. The arrangement of claim 1, further comprising peripheral air outlets of the interspace between the vehicle roof and the roof lining in the region of vehicle windows.

9. The arrangement of claim 8, further comprising closeable flaps closeable over said peripheral air outlets.

10. The arrangement of claim 1, further comprising panel heating elements in the region of the roof lining, said heating elements being area wise controllable.

* * * * *